Figure 1:
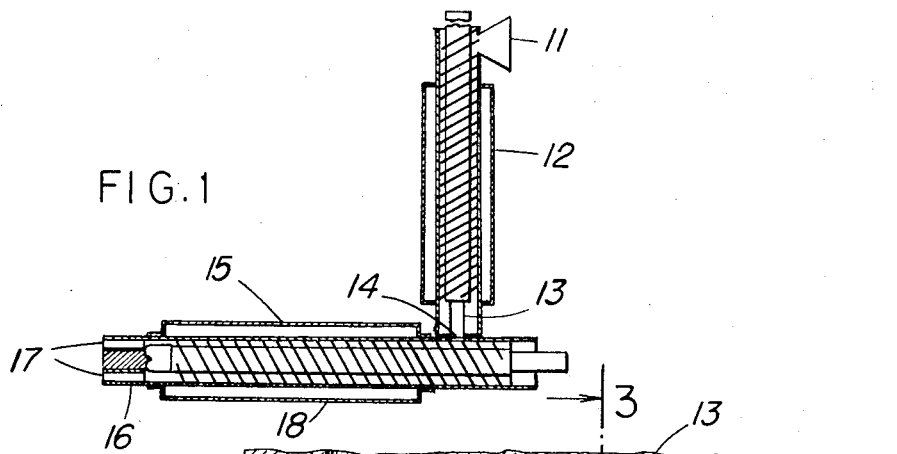

United States Patent [19]

Cronstedt

[11] 3,713,711
[45] Jan. 30, 1973

[54] ROLLING CONTACT BEARING ACCELERATOR

[75] Inventor: Val Cronstedt, Williamsport, Pa.

[73] Assignee: Avco Corporation, Williamsport, Pa.

[22] Filed: May 3, 1971

[21] Appl. No.: 139,646

[52] U.S. Cl. ............................................... 308/187
[51] Int. Cl. ............................................. F16c 33/66
[58] Field of Search ........................................ 308/187

[56] References Cited

UNITED STATES PATENTS 3,549,222    12/1970    Hansen et al. ........................ 308/187

*Primary Examiner*—Milton Kaufman
*Assistant Examiner*—Frank Susko
*Attorney*—Charles M. Hogan and Gary M. Gron

[57] ABSTRACT

The disclosure illustrates a bearing assembly comprising inner and outer races and a plurality of rolling elements positioned between the races for circumferential movement. The bearing normally has a clearance between the rolling elements and the races and is intermittently subjected to radial loads. A retainer which spaces the rolling elements carries a series of turbine buckets. Fluid is directed in the form of a jet against the buckets to rotate the retainer about its axis at a rate intermediate of the inner and outer races. This causes the rolling elements to rotate about their own axes at a speed that approximates their speed when they engage both the inner and outer races.

1 Claim, 2 Drawing Figures

PATENTED JAN 30 1973        3,713,711

INVENTOR.
David E. Johnson

ROLLING CONTACT BEARING ACCELERATOR

The present invention relates to bearing assemblies and more specifically to rolling contact bearing assemblies.

In the mechanical design of high speed rotating, multishaft machinery, such as gas turbine engines used in ship or aircraft which are subjected to momentary large gravitational accelerations, it has been necessary to introduce auxiliary bearings between the shafts to prevent excessive deflections of the shaft systems. Normally these bearings are not subject to radial loads. However, when a gravitational acceleration does occur these bearings are called upon to support a large load.

Frequently a rolling contact bearing is used for this purpose. In this type of bearing assembly the rolling elements, such as balls or rollers, are normally stationary with respect to the outer race during the unloaded condition. That is, they do not roll against the outer race because the centrifugal force acting on them keeps them in contact with that race. The practical need for an internal radial clearance between the rolling elements and the bearing races keeps them away from the inner race and no driving force is present which causes the elements to rotate on their individual axes as the bearing rotates.

When a radial load suddenly is applied to the bearing, the balls or rollers are instantaneously called upon to assume a high rotating speed about their own axes because they come in contact with both the inner and outer races. This rapid acceleration causes the balls or rollers to skid, rapidly causing excessive wear and a reduced service life.

In a bearing assembly using balls as the rolling elements, even though there is a radial clearance between the balls and the races, the balls can be kept in continuous contact with both the inner and outer race by applying an axial force to the bearing, usually by a spring. This insures that the balls are rotating about their own axes at all times. In a cylindrical roller bearing, however, no such simple remedy is available.

Therefore the object of the present invention is to reduce roller skidding in a bearing of the above general type.

This is achieved by providing in a rolling contact roll-type bearing, means for maintaining the rolling elements in rotation about their individual axes generally at a speed which approximates the speed of rotation that occurs when a load is applied and the rollers contact both the inner and outer races.

The above and other related objects and features of the present invention will be apparent from a reading of the description of the disclosure shown in the accompanying drawing and the novelty thereof pointed out in the appended claims.

Figure 2:
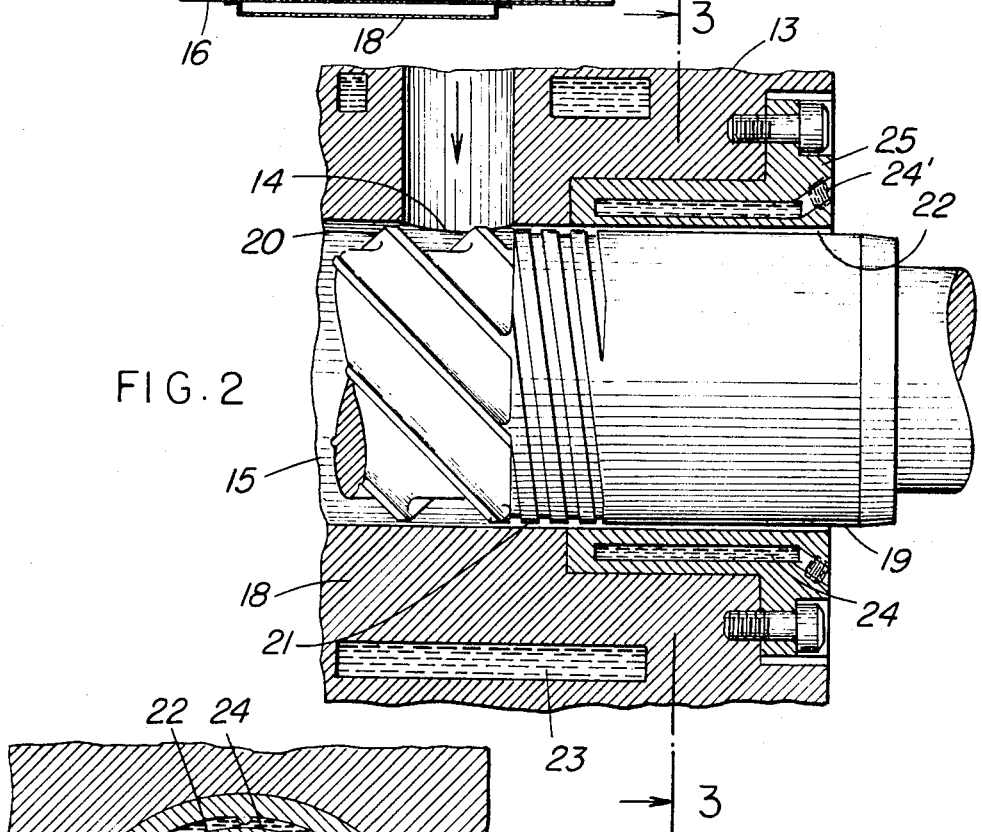
Figure 3:
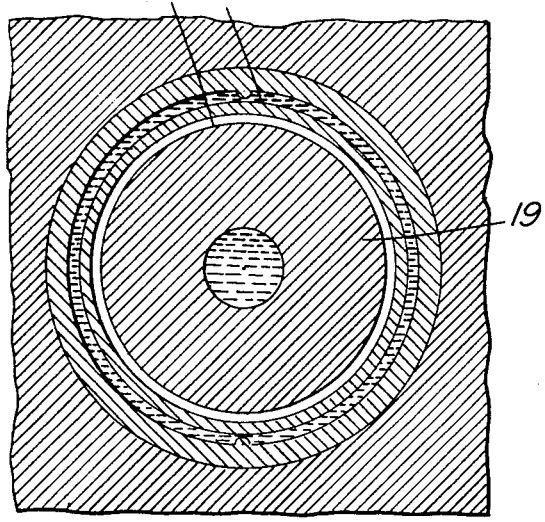
Figure 1:
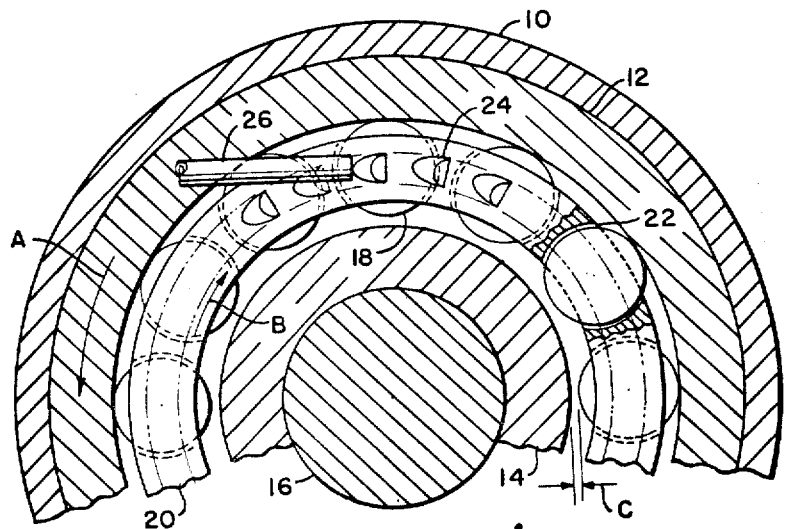
Figure 2:
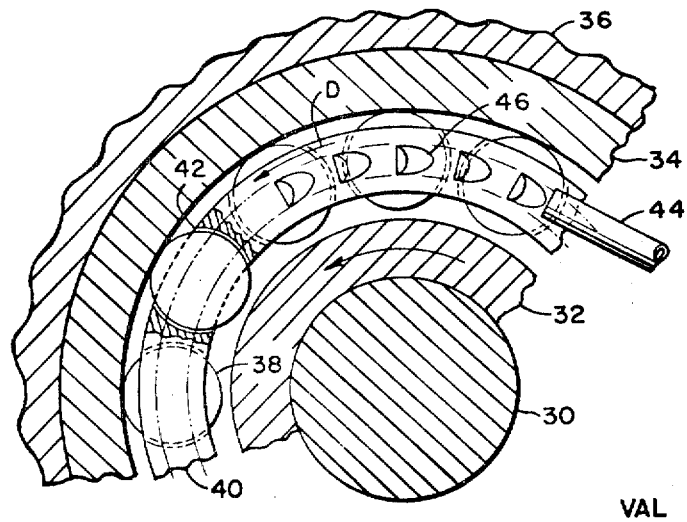

In the drawing:

FIG. 1 is a fragmentary sectional view of a bearing assembly embodying the present invention; and FIG. 2 is a fragmentary sectional view of an alternate embodiment of the present invention.

Referring to FIG. 1 there is shown a bearing assembly for journaling a tubular shaft 10. The bearing assembly comprises an outer race 12 over which the shaft 10 is telescoped and suitably secured. An inner bearing race 14 is telescoped over and suitably secured to a central support shaft 16. A plurality of rolling contact elements 18, herein shown as roller elements, are positioned between the races 12 and 14 for rolling circumferential movement. The rolling elements are spaced from one another by an annular retainer 20 having recesses 22 in which the elements 18 are retained but free to rotate about their own axes.

When a bearing of this type is manufactured it is necessary to introduce a slight radial clearance C (shown in exaggerated proportions) for the purpose of compensating for normal thermal expansion and manufacturing tolerances. A bearing of this type is used to minimize the deflections of shafts subjected to intermittent radial loads. For this type of operation the outer race 12 rotates in the direction shown by arrow A and the rolling elements 18 are held against the outer race by the centrifugal force involved. If the speed of the outer race 12 is 10,000 revolutions per minute the rolling elements are orbiting about the central axis of the bearing at the same speed. The rolling elements 18 are out of contact with the inner race 14 and they do not rotate about their own axes. In a bearing four inches in diameter the acceleration of gravity acting on the rolling elements is approximately 6000 G's or, in other words, their apparent weight is increased 6,000 times.

When a radial load is applied to the shaft 10 the rolling elements 18 contact both the inner and outer races 14 and 12. They then begin to rotate about their own axes. For a roller diameter of, for example, .25 inches and an inner race outside diameter of four inches, the orbiting of the elements 18 about the central axis of the bearing assembly is reduced to about 5300 revolutions per minute. However, the rollers begin to spin on their own axes at approximately 90,000 revolutions per minute. The centrifugal field acting on them is reduced to approximately 1500 G's. The sudden slowing of the orbiting of the rolling elements 18 about the central axis of the bearing from 10,000 revolutions per minute to approximately 5300 and the sudden acceleration of the elements on their own axes from zero to 90,000 revolutions per minute causes them to skid.

In accordance with the present invention, however, a means is provided positively to maintain the rolling elements in rotation about their individual axes generally at a speed that approximates the speed of rotation that occurs when they both the inner and outer races. As herein illustrated this means may take the form of a series of turbine buckets 24 comprising semicircular recesses milled into the side of the retainer 20. A nozzle 26 receiving a suitable pressurized driving fluid discharges a stream of fluid at the turbine buckets 24 to cause the bearing retainer to rotate in the direction of arrow B. An example of the fluid that may be utilized for this purpose is the oil normally used to cool and lubricate the bearing.

For a no load condition the discharge of the fluid against the retainer 20 reduces its rotation about the central axis of the bearing assembly to a level intermediate the rotation of the inner and outer races 14 and 12. This causes the rolling elements 18 to rotate about their individual axes irrespective of any contact from both the inner and outer races 14 and 12.

The amount of fluid discharged and the configuration of the turbine buckets 24 are conveniently selected so that the resultant rotation of the rolling elements 18 about their individual axes approximates the rotation that would occur when they normally contact both the inner and outer races. It is apparent in normal operation that the speed at which this can occur will vary. However, if a design speed in the middle of normal operation is selected the acceleration of de-acceleration of the rolling elements 18 when contact is made will be minimal and the skidding of the rollers will be greatly reduced.

It should be apparent, since there is a yielding coupling between the jet from the nozzle 26 and the retainer 20, that it will yield to the positive drive forces that occur when the rolling elements 18 are in contact with both the inner and outer races 14 and 12.

The embodiment of FIG. 2 illustrates a bearing assembly where the outer race is fixed and the inner race rotates about a central axis. In this bearing assembly a shaft 30 is telescoped into and secured to an inner race 32. An outer race 34 is secured in a housing 36 by a suitable arrangement. Rolling elements 38 are positioned between the races for rolling circumferential movement. This bearing is also designed to have a radial clearance between the rolling elements and the races. A retainer 40 has recesses 42 which receive the rolling elements 38 and space them from one another. In this embodiment a nozzle 44 discharges a suitable driving fluid against turbine buckets 46 milled into the retainer 38. The discharge of the fluid from nozzle 44 against the buckets 46 causes the retainer 40 to rotate in the direction indicated by arrow D.

For this type of bearing under a no load condition the orbiting of rolling elements 38 tends to slow down. The jet from nozzle 44 causes the retainer 40 to rotate and thus orbit the rolling elements 38 about the central axis of the bearing and cause them to rotate about their own axis. In this case the rotation of the retainer 40 about the central axis of the bearing is increased to a level intermediate that for the inner and outer races so that the rotational speed of the rolling elements will be as stated above. As a result, when a radial load is applied to shaft 30 the skidding of the rolling elements when they contact both the inner and outer races will be substantially reduced and the bearing life materially improved.

It is apparent that the bearing assembly described above may be additionally utilized in bearing assemblies where both the inner and outer races are rotated. A typical use for this type of arrangement may be found in a two-spool gas turbine engine which has inner and outer coaxial shafts journaled relative to one another. For that type of bearing it is necessary to determine the rotational conditions for a no radial load case and the conditions with a radial load to see if it is necessary to increase or decrease the rotation of the retainer about the central axis of the bearing.

It should be apparent to those skilled in the art that the bearing assembly described above may be modified without departing from the spirit and scope of the present invention.

Having described the invention, what is claimed as novel and desired to be secured by Letters Patent of the United States is:

1. In a rolling contact bearing assembly having a fixed inner race and a rotatable outer race and a plurality of rolling elements positioned between the races by an annular retainer for rolling circumferential movement at specific circumferential intervals, said bearing assembly having a clearance between the rolling elements and the races and being subjected to intermittent radial loads so that said rolling elements contact one of said races in the absence of a radial load and tend to orbit with that race and contact both races when a radial load is present, the improvement comprising:

a series of turbine buckets formed with said retainer around its periphery;

means for directing a fluid stream against said turbine buckets on said retainer for decreasing the rotation of said retainer about its axis to a level intermediate that for the inner and outer races, thereby maintaining said rolling elements in rotation about their individual axes generally at a speed which approximates the speed of rotation that occurs when the rolling elements contact both the inner and outer races;

whereby skidding is reduced when said bearing is radially loaded to place the rolling elements in contact with both the inner and outer races.

* * * * *

UNITED STATES PATENT OFFICE
CERTIFICATE OF CORRECTION

Patent No. 3,713,711　　　　　　　　　Dated January 30, 1973

Inventor(s) Val Cronstedt

It is certified that error appears in the above-identified patent and that said Letters Patent are hereby corrected as shown below:

On the cover sheet the illustrative drawing should appear as shown below:

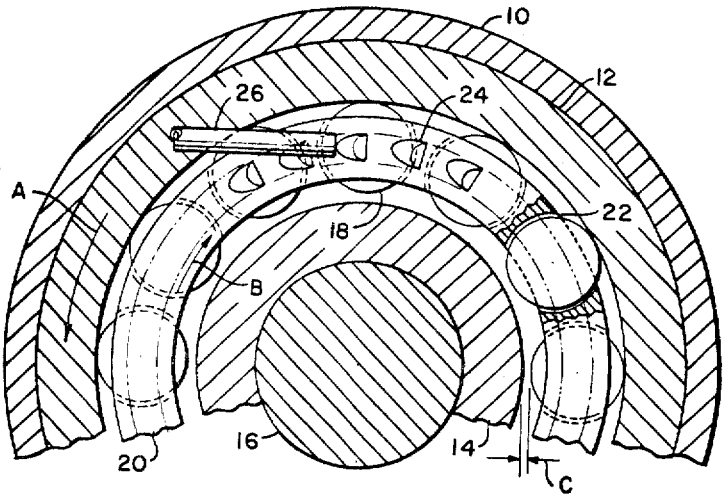

Cancel the sheet of drawing and substitute the attached sheet.

Signed and sealed this 12th day of February 1974.

(SEAL)
Attest:

EDWARD M. FLETCHER, JR.　　　　　　　C. MARSHALL DANN
Attesting Officer　　　　　　　　　　Commissioner of Patents

FORM PO-1050 (10-69)

INVENTOR.
VAL CRONSTEDT
ATTORNEYS.